US010635302B2

(12) United States Patent
Ochi

(10) Patent No.: US 10,635,302 B2
(45) Date of Patent: Apr. 28, 2020

(54) DISPLAY INPUT DEVICE, IMAGE FORMING APPARATUS PROVIDED WITH THE SAME, AND METHOD FOR CONTROLLING DISPLAY INPUT DEVICE

(71) Applicant: KYOCERA Document Solutions Inc., Osaka (JP)

(72) Inventor: Makoto Ochi, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 63 days.

(21) Appl. No.: 16/003,904

(22) Filed: Jun. 8, 2018

(65) Prior Publication Data

US 2018/0373423 A1   Dec. 27, 2018

(30) Foreign Application Priority Data

Jun. 22, 2017   (JP) .................................. 2017-122417

(51) Int. Cl.
*G06F 3/048*       (2013.01)
*G06F 3/0488*      (2013.01)
(Continued)

(52) U.S. Cl.
CPC ........ *G06F 3/04883* (2013.01); *G06F 3/0484* (2013.01); *G06F 3/04845* (2013.01);
(Continued)

(58) Field of Classification Search
CPC ............. G06F 3/04886; G06F 3/04883; G06F 3/0233; G06F 3/04817; G06F 3/0482;
(Continued)

(56) References Cited

U.S. PATENT DOCUMENTS

2013/0194217 A1\* 8/2013 Lee .................... G06F 3/041
345/173
2015/0100913 A1\* 4/2015 Park .................... G06F 21/83
715/773

(Continued)

FOREIGN PATENT DOCUMENTS

JP    2007-272424 A    10/2007
JP    2016-91333 A     5/2016

OTHER PUBLICATIONS

Japanese Office Action dated Feb. 18, 2020, issued to corresponding Japanese Application No. 2017-122417.

*Primary Examiner* — Di Xiao
(74) *Attorney, Agent, or Firm* — Stein IP, LLC

(57) ABSTRACT

A display input device displays a first object in which a plurality of buttons each marked therein with no character are arranged and also displays a second object in which a plurality of frames each marked therein with a character are arranged in an array pattern identical to that of the plurality of buttons. The display input device recognizes, as a subject arrayed position, a position in the first object at which one of the plurality of buttons is arrayed, with respect to which an input operation has been performed, and determines that an instruction has been received to input a character marked in one of the plurality of frames that is arrayed at a position in the second object identical to the subject arrayed position.

8 Claims, 8 Drawing Sheets

(51) Int. Cl.
*H04N 1/00* (2006.01)
*G06F 3/0484* (2013.01)
*H04N 1/44* (2006.01)

(52) U.S. Cl.
CPC ..... *G06F 3/04886* (2013.01); *H04N 1/00411* (2013.01); *H04N 1/4413* (2013.01); *H04N 2201/0094* (2013.01)

(58) Field of Classification Search
CPC .... G06F 3/0416; G06F 3/167; G06F 3/04845; G06F 2203/04803; G06F 3/0236; G06F 3/0237; G06F 3/0238; G06F 3/0488; G06F 17/24; G06F 2203/04104; G06F 2203/04105; G06F 3/016; G06F 3/0414; G06F 3/04842; G06F 3/0485; G06F 21/36; G06F 3/011; G06F 3/0219; G06F 3/0202; G06F 3/044; G06F 1/1662
See application file for complete search history.

(56) References Cited

U.S. PATENT DOCUMENTS

| | | | |
|---|---|---|---|
| 2016/0125182 A1 | 5/2016 | Miura et al. | 21/46 |
| 2018/0136835 A1* | 5/2018 | Heo | G06F 3/0482 |
| 2018/0197180 A1* | 7/2018 | Tsai | G06Q 20/4012 |

* cited by examiner

DISPLAY INPUT DEVICE, IMAGE FORMING APPARATUS PROVIDED WITH THE SAME, AND METHOD FOR CONTROLLING DISPLAY INPUT DEVICE

INCORPORATION BY REFERENCE

This application is based upon and claims the benefit of priority from the corresponding Japanese Patent Application No. 2017-122417 filed on Jun. 22, 2017, the entire contents of which are incorporated herein by reference.

BACKGROUND

The present disclosure relates to a display input device, an image forming apparatus provided with the same, and a method for controlling a display input device.

Conventionally, there is known a system provided with an accepting portion that accepts an input of a password or a passcode from a user. For example, in an apparatus or a system that performs user authentication, based on a password or a passcode inputted by a user, it is determined whether or not said user is a legitimate user.

Furthermore, conventionally, there is known a display input device provided with a touch screen. Such a display input device is installed in, for example, a smartphone or a tablet terminal and functions as an accepting portion that accepts an input of a password or a passcode from a user.

When accepting an input of a password or a passcode from a user, the display input device displays a plurality of input bottoms (for example, a software numeric keypad). Further, an input of a password or a passcode is accepted via the software numeric keypad.

SUMMARY

A display input device according to a first aspect of the present disclosure is provided with a touch screen and a control portion. The touch screen displays an input screen and accepts, from a user, an input operation of inputting a character. The control portion detects the input operation performed with respect to the input screen and determines the character instructed to be inputted by the user. The touch screen displays, within the input screen, a first object in which a plurality of buttons each marked therein with no character are arranged and also displays, in a region within the input screen different from a display region of the first object, a second object in which a plurality of frames each marked therein with a character are arranged in an array pattern identical to that of the plurality of buttons. Upon detecting that the input operation has been performed with respect to any of the plurality of buttons, the control portion recognizes, as a subject arrayed position, a position in the first object at which the any of the plurality of buttons is arrayed, with respect to which the input operation has been performed, and determines that an instruction has been received to input a character marked in one of the plurality of frames that is arrayed at a position in the second object identical to the subject arrayed position.

An image forming apparatus according to a second aspect of the present disclosure is provided with the above-described display input device.

A method for controlling a display input device according to a third aspect of the present disclosure is a method for controlling a display input device that is provided with a touch screen, the touch screen displaying an input screen and accepting, from a user, an input operation of inputting a character, detects the input operation performed with respect to the input screen, and determines the character instructed to be inputted by the user. The method comprises steps of: displaying, within the input screen, a first object in which a plurality of buttons each marked therein with no character are arranged and also displaying, in a region within the input screen different from a display region of the first object, a second object in which a plurality of frames each marked therein with a character are arranged in an array pattern identical to that of the plurality of buttons; and upon detecting that the input operation has been performed with respect to any of the plurality of buttons, recognizing, as a subject arrayed position, a position in the first object at which the any of the plurality of buttons is arrayed, with respect to which the input operation has been performed, and determining that an instruction has been received to input a character marked in one of the plurality of frames that is arrayed in a position in the second object identical to the subject arrayed position.

DETAILED DESCRIPTION

<Device Configuration>

Figure 1:
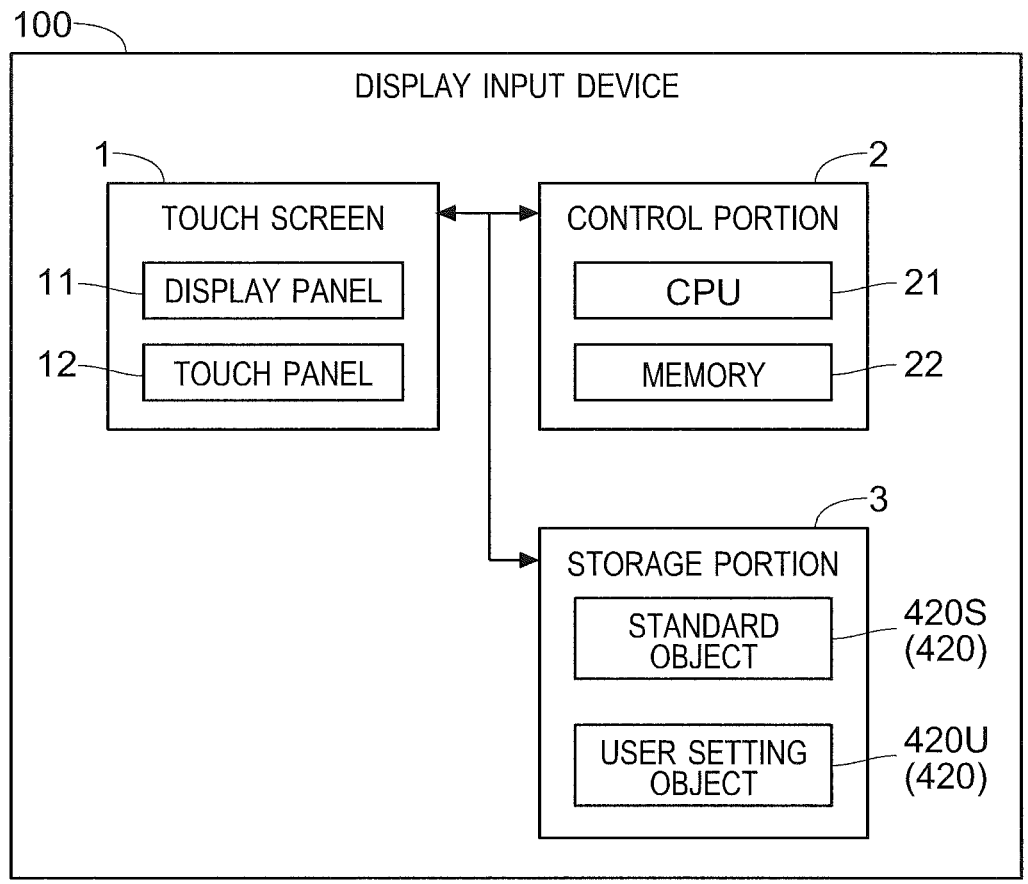
FIG. 1 is a diagram showing a configuration of a display input device according to one embodiment of the present disclosure.

As shown in FIG. 1, a display input device 100 according to one embodiment of the present disclosure is provided with a touch screen 1. The touch screen 1 includes a display panel 11 and a touch panel 12. The display panel 11 is a liquid display panel. The touch panel 12 is a multi-touch panel and is installed on a surface of the display panel 11.

The touch screen 1 displays, on the display panel 11, a screen including software buttons, messages, and so on for accepting various types of settings. Furthermore, the touch screen 1 accepts a touch operation from a user via the touch panel 12.

The display input device 100 is provided also with a control portion 2. The control portion 2 includes a CPU 21 and a memory 22 (a ROM, a RAM, or the like). The memory 22 stores a display program for displaying a screen on the touch screen 1, screen data of the screen to be displayed on the touch screen 1, and so on.

Based on the display program and the screen data, the control portion 2 controls a display action of the touch screen 1. Furthermore, the control portion 2 detects an operation performed with respect to the display input device 100 (such as a touch operation with respect to the touch screen 1). Then, the control portion 2 controls the touch screen 1 to perform a process corresponding to the operation with respect to the display input device 100 (such as a process of switching a display screen of the touch screen 1).

In order to recognize a type of the touch operation with respect to the touch screen 1 (one of the software buttons with respect to which the touch operation has been performed), based on an output value of the touch panel 12, the control portion 2 detects a touch position (coordinates) touched in the touch operation. For example, information indicating a correlation between an output value of the touch panel 12 and a touch position is pre-stored in the memory 22. Upon detecting the touch position, the control portion 2 performs a comparison between said touch position thus detected and a piece of the screen data corresponding to a screen being displayed and, based on a result of the comparison, recognizes the one of the software buttons that is being displayed at the touch position.

The display input device 100 is provided also with a storage portion 3. The storage portion 3 includes a non-volatile storage device such as a ROM (for example, an EEPROM). The control portion 2 is connected to the storage portion 3 and reads out data from the storage portion 3 or writes data into the storage portion 3.

Figure 2:
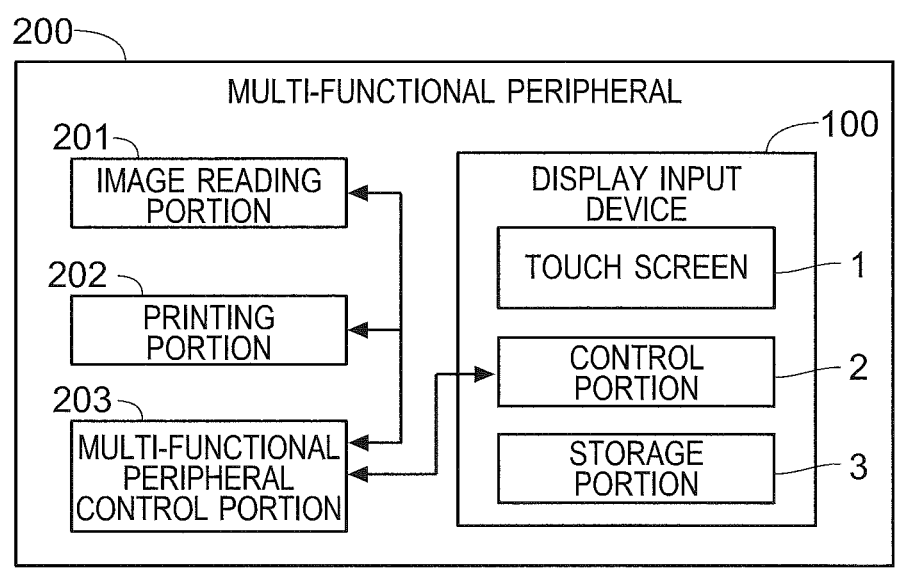
FIG. 2 is a diagram showing a configuration of a multi-functional peripheral provided with the display input device according to one embodiment of the present disclosure.

The display input device 100 can be used as an operation panel for various types of apparatuses such as an image forming apparatus. For example, as shown in FIG. 2, the display input device 100 can be installed in a multi-functional peripheral 200 (corresponding to an "image forming apparatus").

The multi-functional peripheral 200 is provided with an image reading portion 201 that reads an original document and generates image data of the original document, a printing portion 202 that prints, on a paper sheet, an image based on image data (for example, image data of an original document obtained through reading of the original document by the image reading portion 201), and so on. In order to control the image reading portion 201 and the printing portion 202, a multi-function peripheral control portion 203 is provided in the multi-functional peripheral 200.

In a case where the display input device 100 is installed in the multi-functional peripheral 200, the control portion 2 of the display input device 100 is connected to the multi-functional peripheral control portion 203. Further, the control portion 2 receives an instruction from the multi-functional peripheral control portion 203 and, based thereon, controls the display input device 100.

Though not shown, the display input device 100 can be used also as a display of a smartphone, a tablet terminal, or the like. Moreover, the display input device 100 can be used also as a display of an automatic transaction apparatus such as an ATM (an automated teller machine).

<Input Operation>

The display input device 100 accepts an input of a password or a passcode from a user. For example, in a case where the display input device 100 is installed in the multi-functional peripheral 200 of a type having a log-in function, the display input device 100 accepts, from a user, an input of a password used for determining whether or not to permit logging into the multi-functional peripheral 200.

As another example, in a case where the display input device 100 is installed in a portable information terminal such as a smartphone or a tablet terminal, the display input device 100 accepts an input of a password for releasing a screen lock. In a state where the screen lock is unreleased, functions of the portable information terminal are not available. Furthermore, in a case where the display input device 100 is installed in an automatic transaction apparatus such as an ATM, the display input device 100 accepts, from a user, an input of a passcode for using financial services such as money withdrawal.

Generally, a character string including a plurality of characters is used as a password or a passcode. Examples of characters used as a password or a passcode include numerals that are characters indicating numbers and alphabetical letters. The following description uses, as an example, a case where characters used as a password or a passcode are numerals (Arabic numerals).

Figure 3:
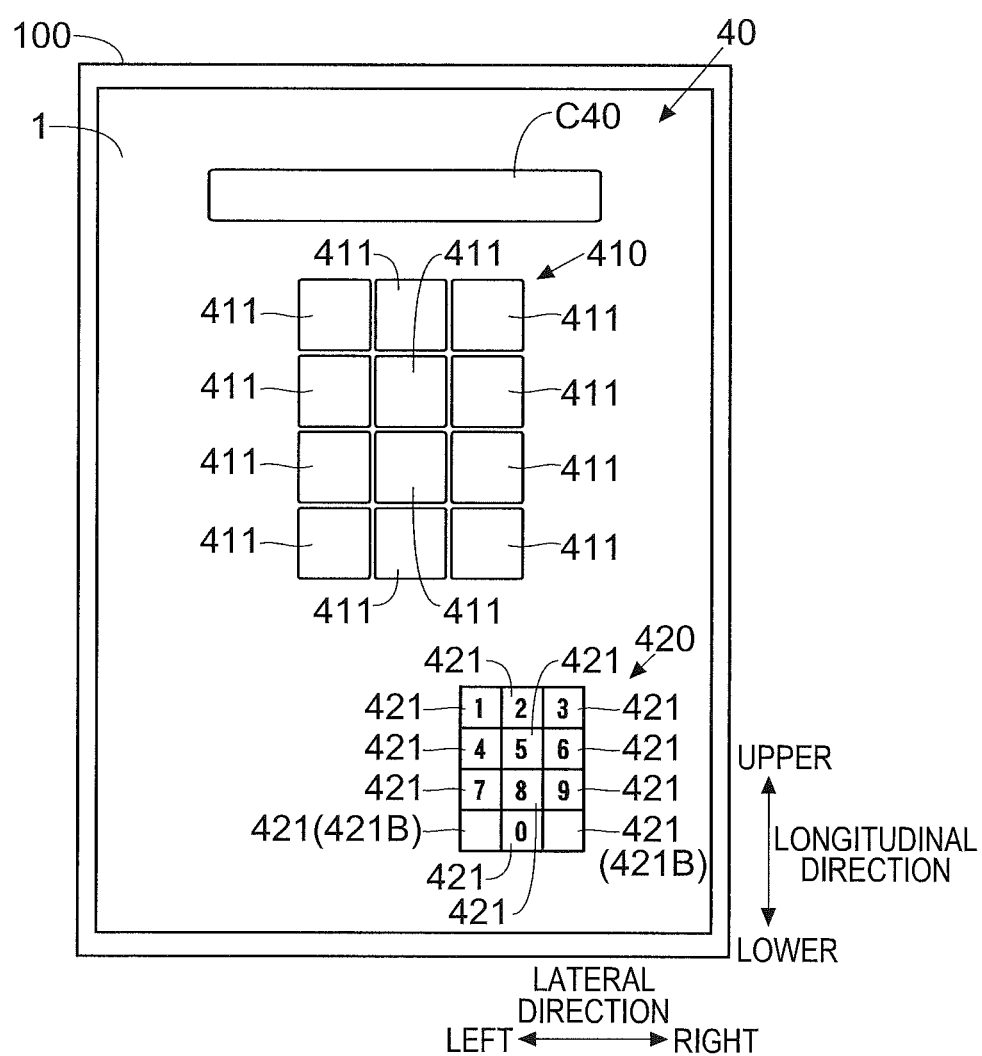
FIG. 3 is a diagram showing an input screen displayed by the display input device according to one embodiment of the present disclosure.

When accepting an input of a password or a passcode from a user, the control portion 2 provides, to the touch screen 1, an instruction to display an input screen 40 as shown in FIG. 3. Upon receiving such a display instruction from the control portion 2, the touch screen 1 displays the input screen 40 and accepts, from a user, an input operation of inputting numerals constituting a password or a passcode (a tap operation as one type of touch operation).

An input field C40 is arranged on the input screen 40. The touch screen 1 displays, in the input field C40, the numerals instructed to be inputted by the user. For example, the numerals instructed to be inputted by the user are replaced with symbols such as asterisks, which then are displayed in the input field C40.

On the input screen 40, there is also arranged a first object 410 including a plurality of input buttons 411 that are software buttons for accepting an input of a numeral from a user. The plurality of input buttons 411 are arranged in a prescribed array pattern. For example, the number of the input buttons 411 is 12. Further, the plurality of input buttons 411 are arranged in a matrix with four rows of input buttons 411 arranged in a longitudinal direction and three columns of input buttons 411 arranged in a lateral direction. That is, the first object 410 is an image of a group of buttons composed of the plurality of input buttons 411 arranged in a matrix.

The group of buttons including the plurality of input buttons 411 functions as a numeric keypad. That is, the first object 410 is a software numeric keypad. Upon a user performing an input operation with respect to any of the plurality of input buttons 411, a numeral assigned to the any of the plurality of input buttons 411 with respect to which the input operation has been performed is inputted (displayed) in the input field C40.

For example, numerals 0, 1, 2, 3, 4, 5, 6, 7, 8, and 9 are assigned to ten of the plurality of input buttons 411, respectively. No numerals are assigned to remaining two of the plurality of input buttons 411 (two of the plurality of input buttons 411 are left unused). Thus, on the input screen 40, it is allowed to input any of these ten different numerals.

With respect to each of the remaining ones of the plurality of input buttons 411, any of the numbers that have already been assigned to the other input buttons 411 may be redundantly assigned. For example, it is possible to assign "1" to one of the input buttons 411 and to assign "1" also to another one of the input buttons 411. In this case, either in a case where an input operation has been performed with respect to the former input button 411 or a case where an input operation has been performed with respect to the latter input button 411, "1" is inputted in the input field C40.

Conventionally, in a generally used type of numeric keypad, each button is marked in its inner region with a numeral (text) corresponding thereto. For example, in a case where "1" has been assigned to a certain button, said button is marked in its inner region with a numeral "1". Accordingly, by looking at the numeral keypad, a user can see to which button a numeral he/she desires to input is assigned. In a case where it is desired to input "1", a button marked with the numeral "1" could be operated.

On the other hand, none of the plurality of input buttons 411 are marked with numerals. That is, an inner region of each of the plurality of input buttons 411 is left blank. Instead, on the input screen 40, there is displayed a second object 420 for making a user (an operator trying to input a numeral) recognize, with respect to each of the plurality of input buttons 411, a numeral to be inputted when an input operation is performed with respect thereto.

Upon receiving a display instruction from the control portion 2, the touch screen 1 displays, within the input screen 40, the second object 420 in addition to the first object 410. At this time, the touch screen 1 displays the second object 420 in a region within the input screen 40 different from a display region of the first object 410 (displays the first object 410 and the second object 420 so that they do not overlap with each other). For example, the touch screen 1 displays the second object 420 in a size smaller than a display size of the first object 410. Furthermore, the touch screen 1 displays the second object 420 at a position lower than a display position of the first object 410. The display position of the second object 420 can be arbitrarily changed by a user (this will be detailed later).

The second object 420 is an image including a plurality of frames 421 each marked therein with a numeral. In other words, the second object 420 includes a plurality of quadrangular graphics. In FIG. 3, for the sake of convenience, lead lines of reference characters are extended from inside the frames 421, respectively.

The number of the frames 421 is equal (12) to the number of the input buttons 411. Further, the plurality of frames 421 are arranged in an array pattern (the prescribed array pattern) identical to that of the plurality of input buttons 411. That is, the plurality of frames 421 are arranged in a matrix with four rows of frames 421 arranged in the longitudinal direction and three columns of frames 421 arranged in the lateral direction. With respect to any pair of adjacent ones of the frames 421, a frame line of one of them overlies a frame line of the other. Because of this, in user's eyes, the frames 421 are viewed as one large outer frame whose inside is divided into a plurality of (12) regions by a plurality of longitudinal lines and a plurality of lateral lines.

Numerals corresponding to the plurality of input buttons 411 included in the first object 410 (the software numeric keypad marked with no numerals) are displayed in the second object 420. By examining the second object 420, a user can see which numeral will be inputted when an input operation is performed with respect to any of the input buttons 411.

For example, it is assumed that a user is trying to input "6". As viewed in the second object 420, one of the plurality of frames 421 that is marked therein with "6" is second from the top and third from the left. In other words, the one of the plurality of frames 421 that is marked therein with "6" is positioned in the second row and the third column. In this case, an input operation is performed with respect to one of the plurality of input buttons 411 included in the first object 410, which is second from the top and third from the left, and thus "6" can be inputted in the input field C40.

Upon an input operation being performed with respect to any of the plurality of input buttons 411, the touch screen 1 outputs a value indicating a touch position (coordinates) to the control portion 2. Then, based on the output value of the touch screen 1, the control portion 2 performs a determination process of determining a numeral instructed to be inputted by a user.

Figure 4:
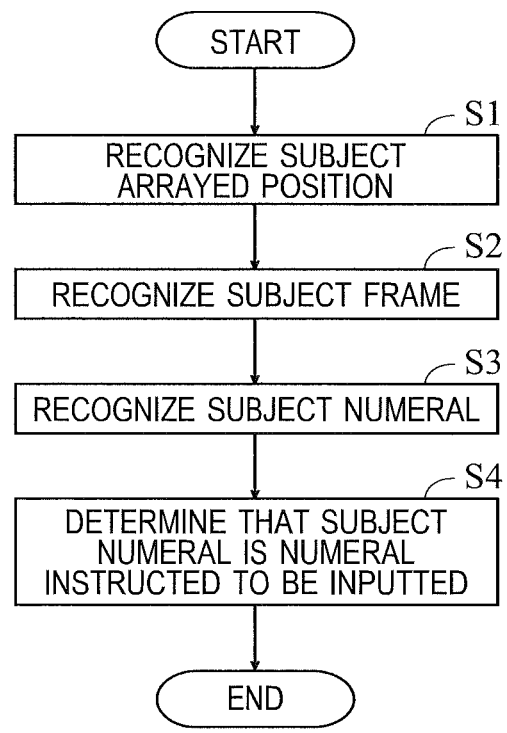
FIG. 4 is a diagram showing a flow of a determination process performed by the display input device according to one embodiment of the present disclosure.

With reference to a flow chart shown in FIG. 4, the following describes a flow of the determination process performed by the control portion 2. The flow chart shown in FIG. 4 starts when the control portion 2 detects that an input operation (a touch operation) has been performed with respect to any of the plurality of input buttons 411.

At step S1, the control portion 2 determines one of the plurality of input buttons 411 with respect to which an input operation has been performed and recognizes, as a subject arrayed position, a position in the first object 410 at which said determined one of the plurality of input buttons 411 is arrayed. For example, the control portion 2 recognizes one of the input buttons 411 with respect to which an input operation has been performed, i.e. in which row from the top and which column from the left the one of the input buttons 411 is positioned.

At step S2, the control portion 2 recognizes, as a subject frame 421, one of the plurality of frames 421 that is arrayed at a position in the second object 420 identical to the subject arrayed position. For example, in a case where an input operation has been performed with respect to one of the input buttons 411 that is in the second row from the top and the third column from the left, one of the plurality of frames 421 that is in the second row from the top and the third column from the left (in an example shown in FIG. 3, one of the plurality of frames 421 that is marked therein with "6") is recognized as the subject frame 421.

At step S3, the control portion 2 recognizes, as a subject numeral, a numeral marked in the subject frame 421. Then, at step S4, the control portion 2 determines that the subject numeral is a numeral instructed to be inputted by a user.

After that, the control portion 2 instructs the touch screen 1 to display the subject numeral in the input field C40. For example, the subject numeral to be displayed in the input field C40 is replaced with a symbol such as an asterisk.

In the example shown in FIG. 3, two of the plurality of frames 421 are not marked therein with numerals. In the following description, the two of the plurality of frames 421 with no numerals marked therein may each be denoted by a reference character 421B and referred to as a blank frame 421B.

Herein, for example, it is assumed that a position in the first object 410 at which one of the plurality of input buttons 411 is arrayed, with respect to which an input operation has been performed, is identical to a position in the second object 420 at which the blank frame 421B is arrayed. That is, it is assumed that an input operation has been performed with respect to one of the input buttons 411 that is in the fourth row from the top and the first column from the left or in the fourth row from the top and the third column from the left.

In this case, the control portion 2 recognizes that the input operation with respect that one of the input buttons 411 is an invalid operation. Consequently, even when a user performs an input operation with respect to one of the input buttons 411 that is arrayed in the same positional relationship with the blank frame 421B, no numeral is inputted (displayed) in the input field C40. Thus, with the blank frame 421B set to be included in the second object 420, one of the input buttons 411 that is arrayed in the same positional relationship with the blank frame 421B can be made to function as a dummy button (a button that cancels an input operation that has been performed by a user).

As described above, the display input device 100 according to this embodiment is provided with the touch screen 1 that displays the input screen 40 and accepts, from a user, an input operation of inputting a numeral (a character) and the control portion 2 that detects the input operation performed with respect to the input screen 40 and determines the numeral instructed to be inputted by the user. The touch screen 1 displays, within the input screen 40, the first object 410 in which the plurality of input buttons 411 each marked therein with no numeral are arranged and also displays, in a region within the input screen 40 different from a display region of the first object 410, the second object 420 in which the plurality of frames 421 each marked therein with a numeral are arranged in an array pattern (the prescribed array pattern) identical to that of the plurality of input buttons 411. Upon detecting that an input operation has been performed with respect to any of the plurality of input buttons 411, the control portion 2 recognizes, as the subject arrayed position, a position in the first object 410 at which the any of the plurality of input buttons 411 is arrayed, with respect to which the input operation has been performed, and determines that an instruction has been received to input a numeral marked in one of the plurality of frames 421 that is arrayed at a position in the second object 420 identical to the subject arrayed position.

In a configuration according to this embodiment, the first object 410 in which the plurality of input buttons 411 each marked therein with no character is displayed within the input screen 40 of the touch screen 1. While an input operation of inputting a numeral is performed with respect to the plurality of input buttons 411, the plurality of input buttons 411 are each marked therein with no numeral. Accordingly, even when the input screen 40 of the touch screen 1 is peeped at by a third person while a user is performing an input operation (even when one of the plurality of input buttons 411 with respect to which an input operation has been performed is seen by a third person), it is possible to reduce a possibility that a numeral inputted by the user is identified by a third person.

Herein, in a region within the input screen 40 of the touch screen 1 different from a display region of the first object 410, there is displayed the second object 420 in which the plurality of frames 421 each marked therein with a numeral are arranged in an array pattern (the predetermined array pattern) identical to that of the plurality of input buttons 411. Numerals assigned to the plurality of input buttons 411, respectively, are displayed in the second object 420. Thus, even though the plurality of input buttons 411 are each marked therein with no numeral, by looking at the second object 420, a user can easily see to which one of the input buttons 411 a numeral he/she desires to input is assigned. Accordingly, user's convenience is prevented from being deteriorated.

<Rotary Operation>

While the input screen 40 is being displayed, the control portion 2 controls the touch screen 1 to accept a preset rotary operation. For example, the touch screen 1 accepts, as the rotary operation, a touch operation in which the touch screen 1 is touched at two points, and while the touch screen 1 is kept touched, touch positions of the two points are moved along an arc about substantially a middle between the touched two points as a fulcrum.

Upon detecting that the rotary operation has been performed with respect to the touch screen 1, the control portion 2 instructs the touch screen 1 to rotate the second object 420. Upon receiving such a rotary instruction from the control portion 2, the touch screen 1 rotates the second object 420. A rotation angle of the second object 420 varies depending on an amount of rotation made in the rotary operation (an amount of movement of a touch position). For example, the second object 420 is rotated by any angle among 90°, 180°, and 270° (a rotation angle of the second object 420 increases with increasing amount of rotation made in the rotary operation). Information indicating a correlation between an amount of rotation made in the rotary operation and the rotation angle is prestored in the memory 22 of the control portion 2.

For example, it is assumed that the touch screen 1 has accepted such a rotary operation while the input screen 40 shown in FIG. 3 is being displayed. Furthermore, it is assumed that a rotation angle corresponding to an amount of rotation made in the rotary operation accepted by the touch screen 1 is 90°.

Figure 5:
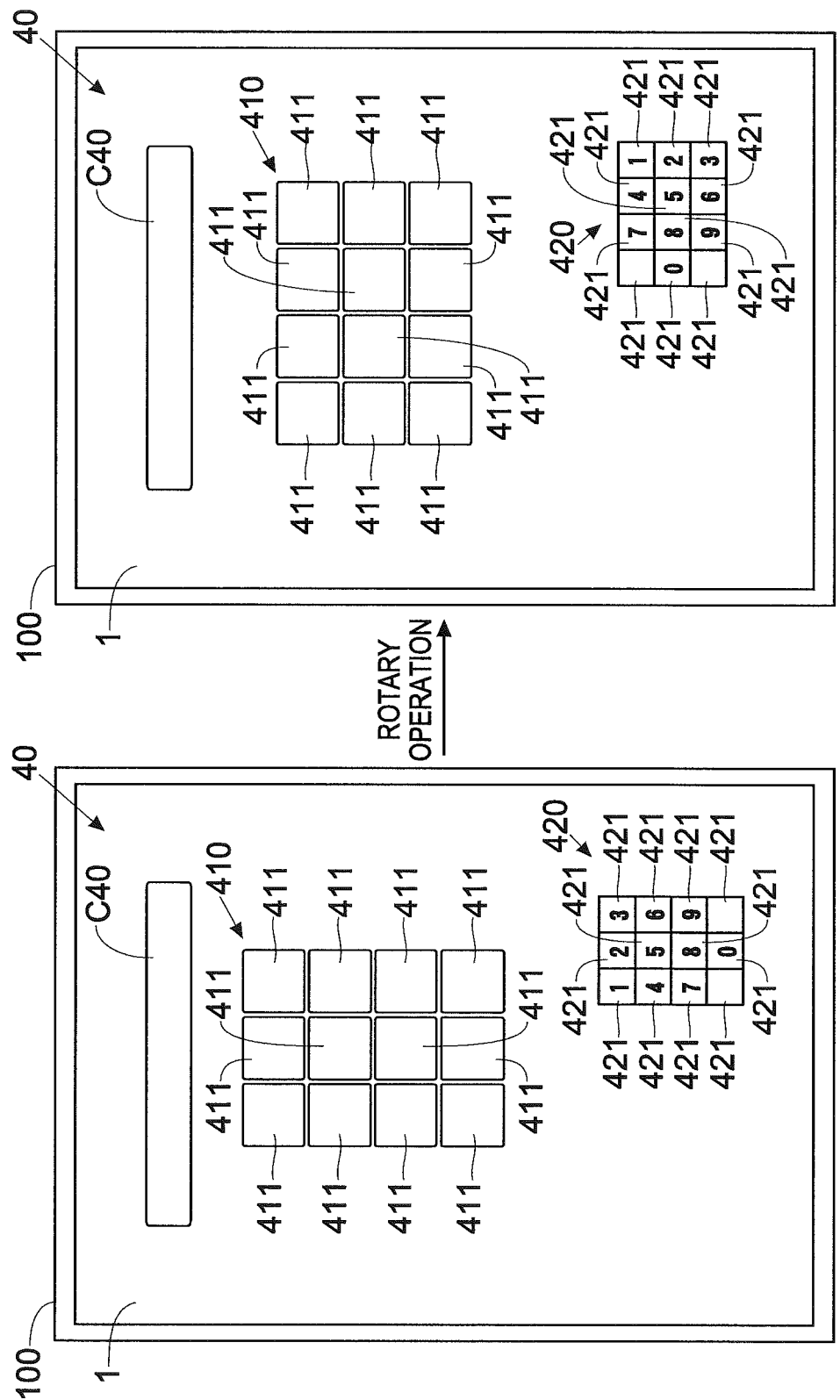
FIG. 5 is a diagram for explaining a display action performed, upon accepting a rotary operation, by the display input device according to one embodiment of the present disclosure.

In this case, as shown in FIG. 5, the touch screen 1 rotates the second object 420 90° about a center of the second object 420 as a fulcrum. For example, the second object 420 is rotated in a clockwise direction. After rotating the second object 420, the touch screen 1 changes an orientation of a numeral marked in each of the frames 421 to upward.

Herein, in an example shown in FIG. 5, the number of columns of input buttons 411 arranged in the lateral direction is different from the number of rows of input buttons 411 arranged in the longitudinal direction. Because of this, when only the second object 420 is rotated, an array pattern of the plurality of frames 421 no longer agrees with an array pattern of the plurality of input buttons 411.

For this reason, in a case where the number of columns of input buttons 411 arranged in the lateral direction is different from the number of rows of input buttons 411 arranged in the longitudinal direction, upon detecting that a rotary operation has been performed with respect to the touch screen 1, the control portion 2 instructs the touch screen 1 to rotate not only the second object 420 but also the first object 410. Upon receiving, from the control portion 2, the instruction to rotate the first object 410, the touch screen 1 rotates the first object 410 about a center of the first object 410 as a fulcrum. In the example shown in FIG. 5, the first object 410 is rotated 90° in a clockwise direction. Thus, an array pattern of the plurality of frames 421 agrees with an array pattern of the plurality of input buttons 411.

Figure 6:
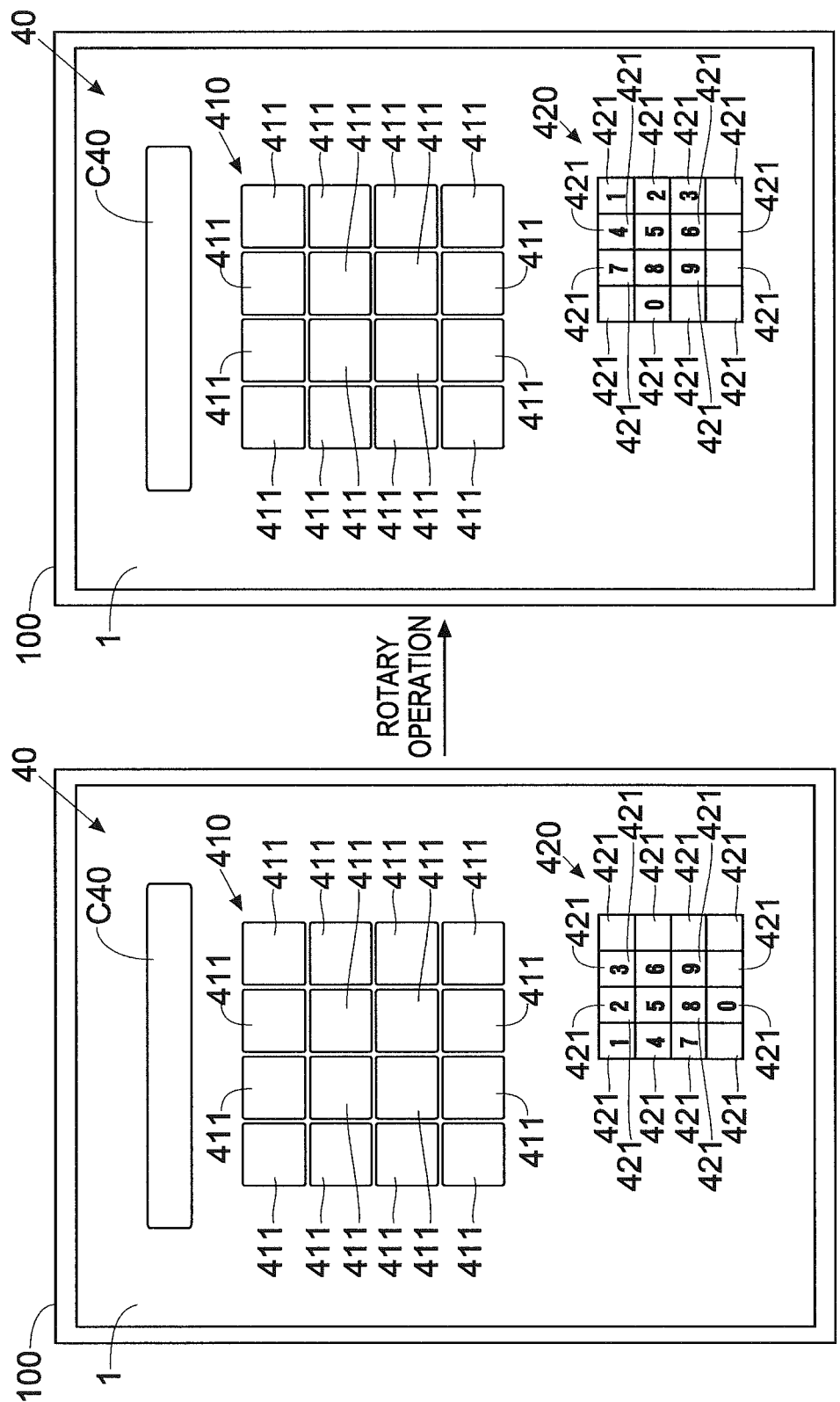
FIG. 6 is a diagram for explaining a display action performed, upon accepting the rotary operation, by the display input device according to one embodiment of the present disclosure.

As shown in FIG. 6, there is a case where the number of columns of input buttons 411 arranged in the lateral direction is equal to the number of rows of input buttons 411 arranged in the longitudinal direction. That is, there is a case where the number of columns of frames 421 arranged in the lateral direction is equal to the number of rows of frames 421 arranged in the longitudinal direction. In this case, even when only the second object 420 is rotated, an array pattern of the plurality of frames 421 agrees with an array pattern of the plurality of input buttons 411. Accordingly, in a case where the number of columns of input buttons 411 arranged in the lateral direction is equal to the number of rows of input buttons 411 arranged in the longitudinal direction (in a case where the number of columns of frames 421 arranged in the lateral direction is equal to the number of rows of frames 421 arranged in the longitudinal direction), upon accepting a rotary operation, the touch screen 1 rotates only the second object 420.

Upon detecting that an input operation has been performed with respect to any of the plurality of input buttons 411 after the touch screen 1 had accepted a rotary operation (after the second object 420 had been rotated), the control portion 2 determines that an instruction has been received to input a numeral (the subject numeral) marked in one of the plurality of frames 421 that is arrayed at a position in the thus rotated second object 420 identical to the subject arrayed position.

For example, in an example shown in a left drawing in FIG. 6, when an input operation is performed with respect to one of the input buttons 411 that is positioned in the second row from the top and the third column from the left, "6" is inputted in the input field C40. On the other hand, in an example shown in a right drawing in FIG. 6, when an input operation is performed with respect to one of the input buttons 411 that is positioned in the second row from the top and the third column from the left, "5" is inputted in the input field C40. In the example shown in the right drawing in FIG. 6, in order to input "6" in the input field C40, it is required that an input operation be performed with respect to one of the input buttons 411 that is positioned in the third row from the top and the third column from the left.

In this configuration, by performing a rotary operation, it is possible to change numbers assigned to the plurality of input buttons 411, respectively. That is, even with the same numeral string (character string) constituting a password or a passcode, it is possible to change those of the input buttons 411 that should be operated at the time of inputting said numeral string. Thus, it is possible to reduce occurrence of an inconvenience that, based on a fingerprint adhering position on the touch screen 1, a numeral string constituting a password or a passcode is identified by a third person.

<Switching Operation>

While the input screen 40 is being displayed, the control portion 2 controls the touch screen 1 to accept a preset switching operation. For example, the touch screen 1 accepts, as the switching operation, a touch operation (a flick operation) in which a surface of the touch screen 1 is touched with a finger in a flicking manner.

Upon detecting that the switching operation has been performed with respect to the touch screen 1, the control portion 2 instructs the touch screen 1 to switch the second object 420. Upon receiving such a switching instruction from the control portion 2, the touch screen 1 newly displays another second object 420 in place of the second object 420 currently being displayed.

For example, a standard object 420S registered as the second object 420 by a manufacturer is pre-stored in the storage portion 3 (see FIG. 1). Moreover, a user setting object 421U composed of numerals to be marked in the plurality of frames 421, respectively, which are arbitrarily set and registered by a user, is also stored in the storage portion 3 (see FIG. 1).

Figure 7:
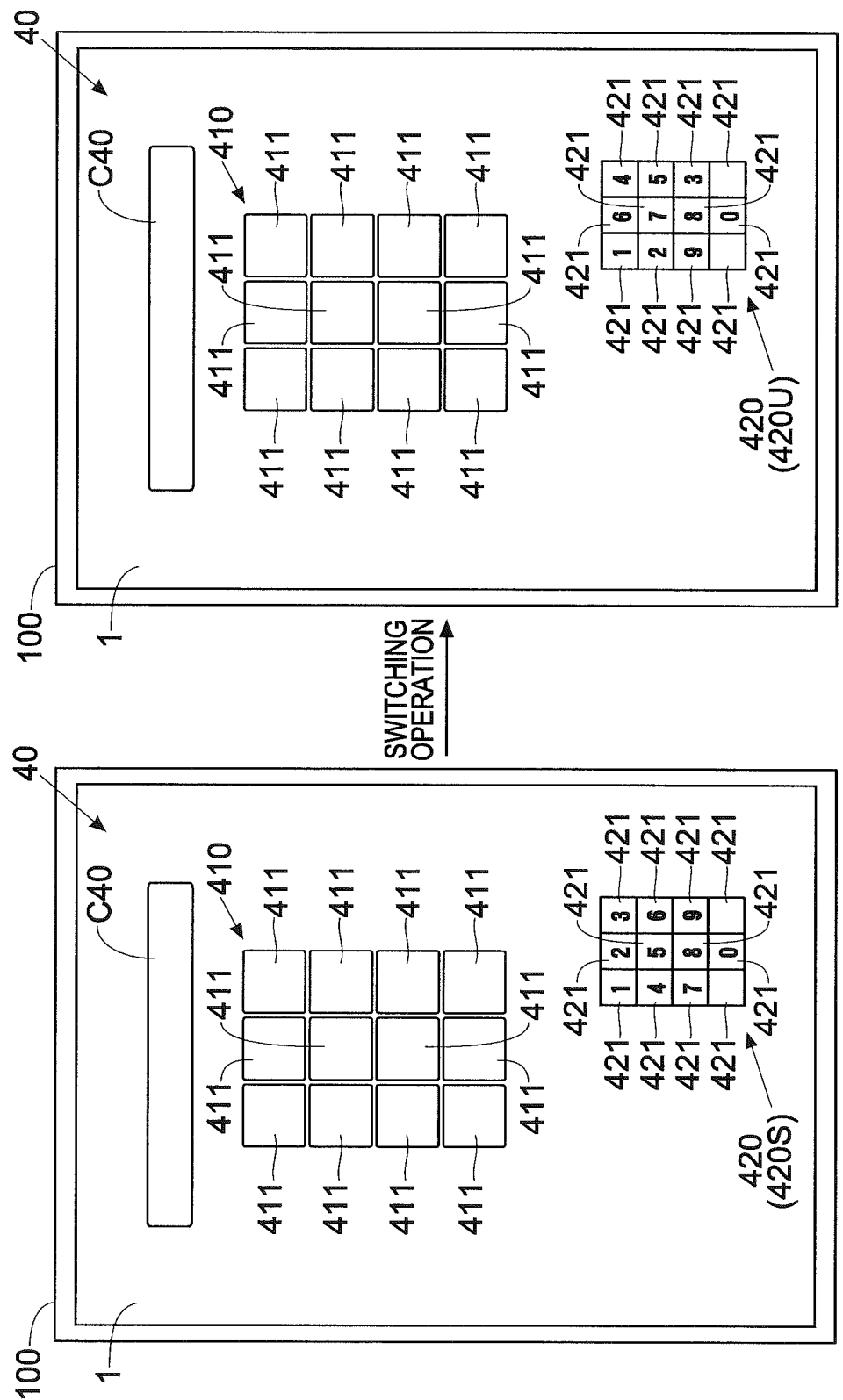
FIG. 7 is a diagram for explaining a display action performed, upon accepting a switching operation, by the display input device according to one embodiment of the present disclosure.

Further, as shown in a left drawing in FIG. 7, the control portion 2 first controls the touch screen 1 to display the input screen 40 so that the input screen 40 includes the standard object 420S as the second object 420. It is assumed that the touch screen 1 has subsequently accepted a switching operation. At this time, as shown in a right drawing in FIG. 7, the control portion 2 controls the touch screen 1 to perform switching from the standard object 420S to the user setting object 420U. That is, the touch screen 1 displays the user setting object 420U as a new second object 420 in place of the standard object 420S currently being displayed as the second object 420.

There is no particular limitation on the number of user setting objects 420U registered, and a plurality of user setting objects 420U may be registered. For example, it is assumed that two user setting objects 420U have been registered. In this case, after switching has been made from the standard object 420S to one of the user setting objects 420U, upon receiving a switching operation, the touch screen 1 performs switching from the one of the user setting objects 420U currently being displayed to the other user setting object 420U. After that, upon again receiving a switching operation, the touch screen 1 performs switching from the other user setting object 420U currently being displayed to the standard object 420S.

In this configuration, even when a numeral string (a character string) constituting a passcode is changed, the same ones of the input buttons 411 that should be operated in order to input an original passcode can be used to input a passcode to which the original passcode has been changed. Thus, user's convenience is improved. For example, in an example shown in FIG. 7, it is assumed that a user has changed a passcode from "76" to "95". In this case, in inputting the passcode "95" to which the original passcode "76" has been changed, the user setting object 420U (the second object 420) shown in the right drawing in FIG. 7 could be displayed beforehand.

<Display Size Changing Operation>

While the input screen 40 is being displayed, the control portion 2 controls the touch screen 1 to accept a preset display size changing operation. For example, the touch screen 1 accepts, as the display size changing operation, a touch operation (a pinch-out operation and a pinch-in operation) in which the touch screen 1 is touched at two points, and while the touch is maintained, a distance between the touched two points is changed.

Figure 8:
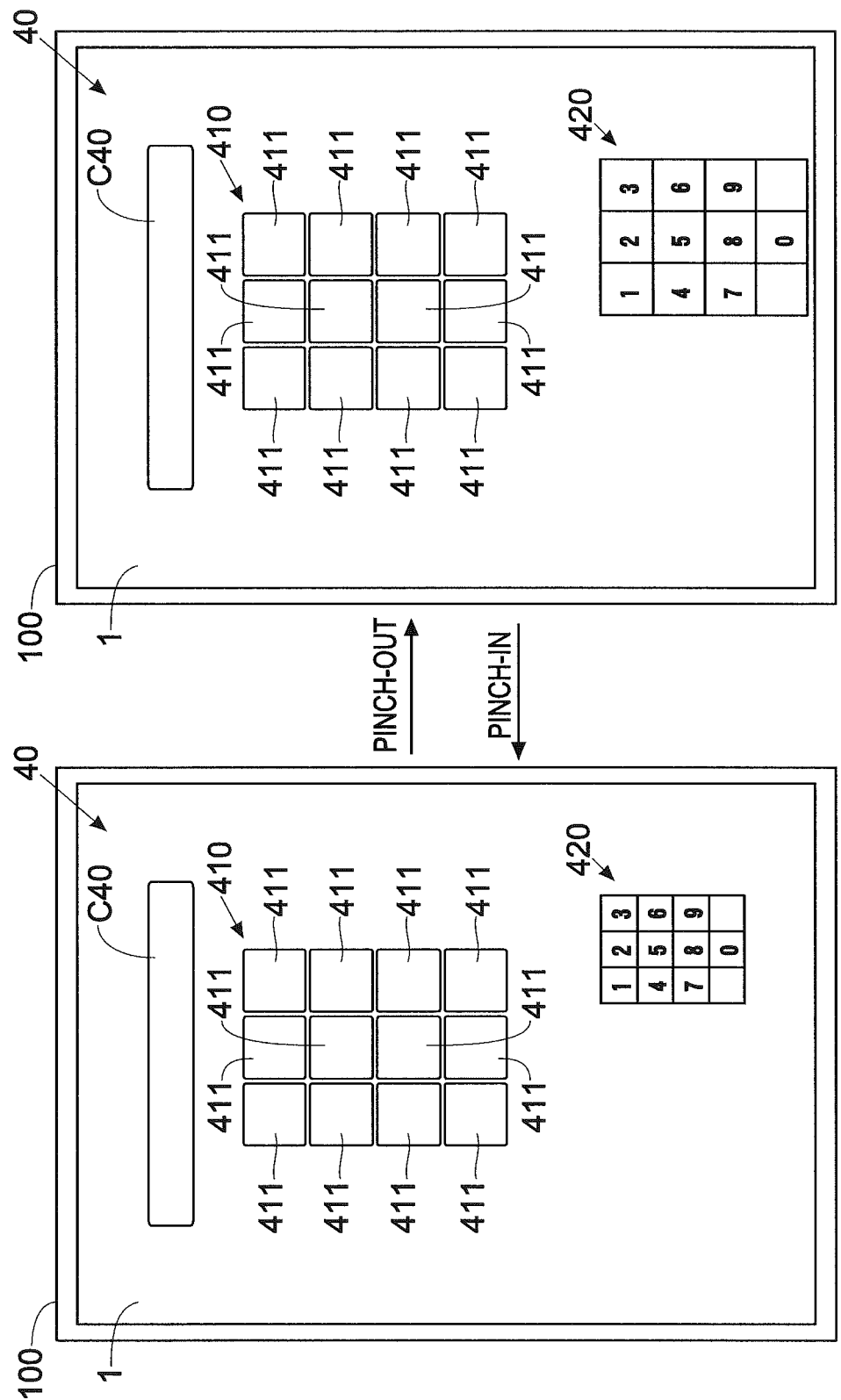
FIG. 8 is a diagram for explaining a display action performed, upon accepting a display size changing operation, by the display input device according to one embodiment of the present disclosure.

Upon detecting that the pinch-out operation as the display size changing operation has been performed with respect to the touch screen 1, the control portion 2 instructs the touch screen 1 to zoom in the second object 420. In this case, as shown in FIG. 8, the touch screen 1 increases a display size of the second object 420 from a current display size (a display size immediately before such a zoom-in instruction is received) to a larger size (a transition is made from a left drawing in FIG. 8 to a right drawing in FIG. 8).

Furthermore, upon detecting that the pinch-in operation as the display size changing operation has been performed with respect to the touch screen 1, the control portion 2 instructs the touch screen 1 to zoom out the second object 420. In this case, as shown in FIG. 8, the touch screen 1 reduces a display size of the second object 420 from a current display size (a display size immediately before such a zoom-out instruction is received) to a smaller size (a transition is made from the right drawing in FIG. 8 to the left drawing in FIG. 8).

In this configuration, a display size of the second object 420 can be arbitrarily changed by a user, and thus user's convenience is improved. For example, in a case where the second object 420 is too small for viewing, a display size of the second object 420 can be increased. Furthermore, in a case where there is a third person in surroundings of a user, a display size of the second object 420 is reduced, and thus even when an input operation by the user is peeped at by the third person, it can be made difficult to identify a password or a passcode inputted by the user.

<Display Position Changing Operation>

While the input screen 40 is being displayed, the control portion 2 controls the touch screen 1 to accept a preset display position changing operation. For example, the touch screen 1 accepts, as the display position changing operation, a touch operation (a drag-and-drop operation) in which a display region of the second object 420 is touched, and while the touch is maintained, a touch position is moved.

Figure 9:
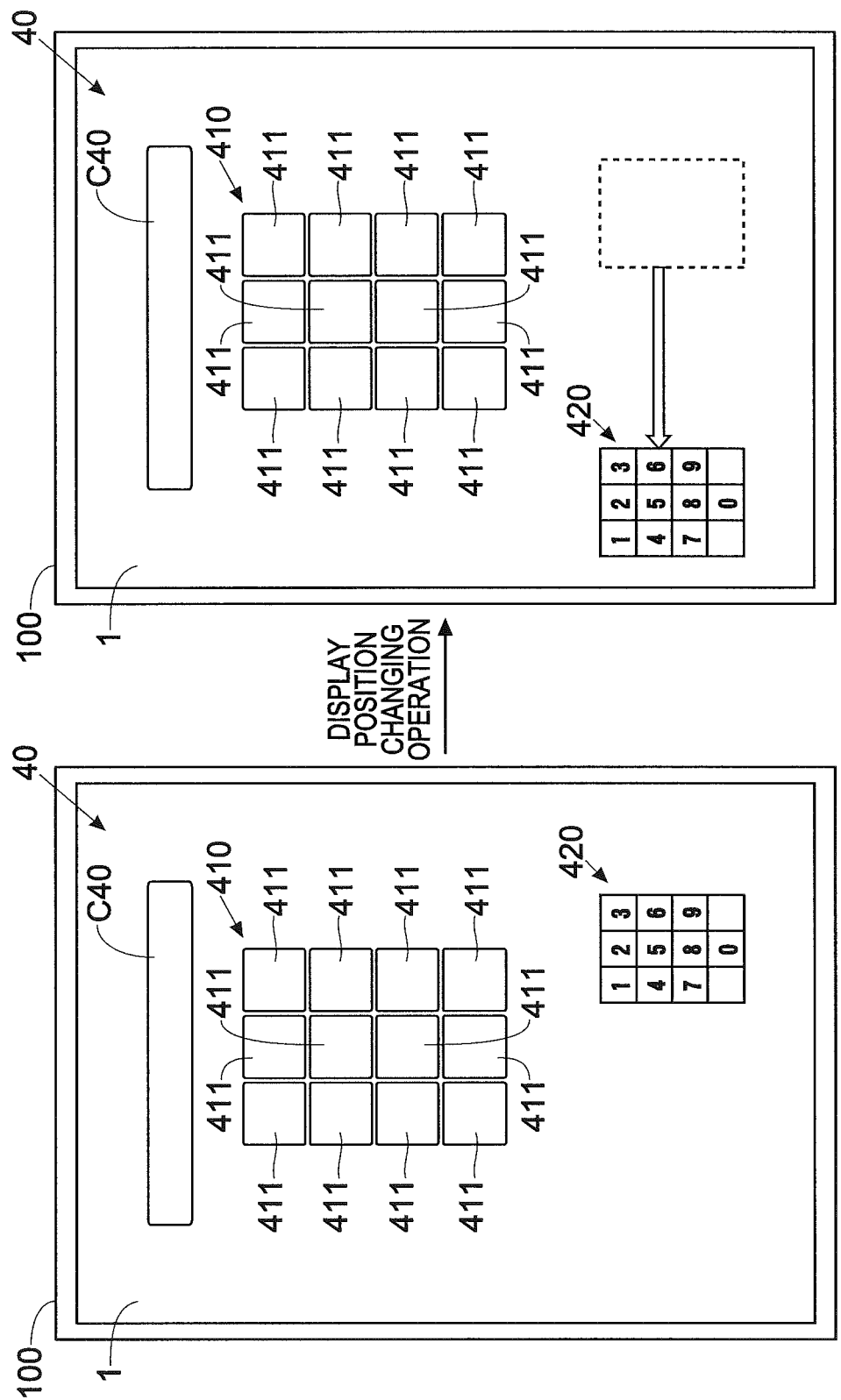
FIG. 9 is a diagram for explaining a display action performed, upon accepting a display position changing operation, by the display input device according to one embodiment of the present disclosure.

Upon detecting that the display position changing operation has been performed with respect to the touch screen 1, the control portion 2 instructs the touch screen 1 to move the second object 420. In this case, as shown in FIG. 9, the touch screen 1 moves the second object 420 in accordance with movement of a touch position, and upon a touch being released, stops moving the second object 420. In a right drawing in FIG. 9, a hollow arrow indicates a trace along which the second object 420 has been moved. Furthermore, a broken line indicates a display region of the second object 420 before being moved.

In this configuration, a display position of the second object 420 can be arbitrarily changed by a user, and thus operator's convenience is improved.

The embodiment disclosed herein is to be construed in all respects as illustrative and not limiting. The scope of the present disclosure is indicated by the appended claims rather than by the foregoing description of the embodiment, and all changes that come within the meaning and range of equivalency of the claims are intended to be embraced therein.

What is claimed is:

1. A display input device, comprising:
   a touch screen that displays an input screen and accepts, from a user, an input operation of inputting a character; and
   a control portion that detects the input operation performed with respect to the input screen and determines the character instructed to be inputted by the user, wherein
   the touch screen displays, within the input screen, a first object in which a plurality of buttons each marked therein with no character are arranged and also displays, in a region within the input screen different from a display region of the first object, a second object in which a plurality of frames each marked therein with a character are arranged in an array pattern identical to that of the plurality of buttons,
   upon detecting that the input operation has been performed with respect to any of the plurality of buttons, the control portion recognizes, as a subject arrayed position, a position in the first object at which the any of the plurality of buttons is arrayed, with respect to which the input operation has been performed, and determines that an instruction has been received to input a character marked in one of the plurality of frames that is arrayed at a position in the second object identical to the subject arrayed position,
   while the input screen is being displayed, upon accepting a preset rotary operation from the user, the touch screen rotates the second object depending on an amount of rotation made in the rotary operation,
   upon detecting that the input operation has been performed with respect to any of the plurality of buttons of the first object after the touch screen had accepted the rotary operation, the control portion determines that an instruction has been received to input a character marked in one of the plurality of frames that is arrayed at a position in the thus rotated second object identical to the subject arrayed position,
   in a case where the touch screen is displaying, as the first object, an object in which a number of columns of the buttons arranged in a lateral direction is equal to a number of rows of the buttons arranged in a longitudinal direction, upon accepting the rotary operation from the user, the touch screen rotates only the second object, and
   in a case where the touch screen is displaying, as the first object, an object in which a number of columns of the buttons arranged in a lateral direction is equal to a number of rows of the buttons arranged in a longitudinal direction, upon accepting the rotary operation from the user, the touch screen rotates only the second object, and
   in a case where the touch screen is displaying as the first object, an object in which a number of columns of the buttons arranged in the lateral direction is different from a number of rows of the buttons arranged in the longitudinal direction, upon accepting the rotary operation from the user, the touch screen rotates the second object and also rotates the first object at an angle equal to a rotation angle of the second object.

2. The display input device according to claim 1, wherein the touch screen accepts, as the rotary operation, a touch operation in which the touch screen is touched at two points, and while the touch screen is kept touched, touch positions of the two points are moved along an arc about a middle between the two points as a fulcrum.

3. The display input device according to claim 1, wherein the touch screen increases a rotation angle of the second object with increasing amount of rotation made in the rotation operation.

4. The display input device according to claim 1, wherein upon accepting a preset switching operation from a user, the touch screen displays, in place of the second object currently being displayed, a user setting object composed of characters to be marked in the plurality of frames, respectively, which are arbitrarily set and registered by the user, as an object to be newly displayed as the second object.

5. The display input device according to claim 1, wherein upon accepting a preset display size changing operation from a user, the touch screen changes a display size of the second object.

6. The display input device according to claim 1, wherein upon accepting a preset display position changing operation from a user, the touch screen changes a display position of the second object.

7. An image forming apparatus comprising the display input device according to claim 1.

8. A method for controlling a display input device that includes a touch screen, the touch screen displaying an input screen and accepting, from a user, an input operation of inputting a character, detects the input operation performed with respect to the input screen, and determines the character instructed to be inputted by the user, the method comprising steps of:
   displaying, within the input screen, a first object in which a plurality of buttons each marked therein with no character are arranged and also displaying, in a region within the input screen different from a display region of the first object, a second object in which a plurality of frames each marked therein with a character are arranged in an array pattern identical to that of the plurality of buttons;

upon detecting that the input operation has been performed with respect to any of the plurality of buttons, recognizing, as a subject arrayed position, a position in the first object at which the any of the plurality of buttons is arrayed, with respect to which the input operation has been performed, and determining that an instruction has been received to input a character marked in one of the plurality of frames that is arrayed in a position in the second object identical to the subject arrayed position, while the input screen is being displayed, upon accepting a preset rotary operation from the user, rotating the second object depending on an amount of rotation made in the rotary operation, and upon detecting that the input operation has been performed with respect to any of the plurality of buttons of the first object after the touch screen had accepted the rotary operation, determining that an instruction has been received to input a character marked in one of the plurality of frames that is arrayed at a position in the thus rotated second object identical to the subject arrayed position, wherein in a case where the touch screen is displaying, as the first object, an object in which a number of columns of the buttons arranged in a lateral direction is equal to a number of rows of the buttons arranged in a longitudinal direction, upon accepting the rotary operation from the user, the touch screen rotates only the second object, and in a case where the touch screen is displaying, as the first object, an object in which a number of columns of the buttons arranged in a lateral direction is different from a number of rows of the buttons arranged in the longitudinal direction, upon accepting the rotary operation from the user, the touch screen rotates the second object and also rotates the first object at an angle equal to a rotation angle of the second object.

* * * * *